(12) United States Patent
Kuo et al.

(10) Patent No.: US 12,405,521 B2
(45) Date of Patent: Sep. 2, 2025

(54) PROJECTION SYSTEM AND PROJECTION METHOD APPLYING THE SAME

(71) Applicant: Coretronic Corporation, Hsin-Chu (TW)

(72) Inventors: Pen-Ning Kuo, Hsin-Chu (TW); Fu-Shan Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 392 days.

(21) Appl. No.: 17/981,476

(22) Filed: Nov. 7, 2022

(65) Prior Publication Data

US 2023/0146029 A1    May 11, 2023

(30) Foreign Application Priority Data

Nov. 8, 2021  (CN) .......................... 202111311897.6

(51) Int. Cl.
*G03B 21/20*  (2006.01)
*H04N 9/31*  (2006.01)

(52) U.S. Cl.
CPC ....... *G03B 21/2006* (2013.01); *G03B 21/206* (2013.01); *H04N 9/3155* (2013.01)

(58) Field of Classification Search
CPC .. G03B 21/005; G03B 21/006; G03B 21/008; G03B 21/20; G03B 21/28; G03B 21/14;
(Continued)

(56) References Cited

U.S. PATENT DOCUMENTS

| 5,654,775 A | 8/1997 | Brennesholtz |
| 11,852,962 B2 | 12/2023 | Weng |

(Continued)

FOREIGN PATENT DOCUMENTS

| CN | 103064239 | 4/2013 |
| CN | 103069806 | 4/2013 |

(Continued)

OTHER PUBLICATIONS

"Office Action of China Counterpart Application", issued on Apr. 10, 2024, p. 1-p. 8.

(Continued)

*Primary Examiner* — Sultan Chowdhury
(74) *Attorney, Agent, or Firm* — JCIPRNET

(57) ABSTRACT

A projection system includes projection devices and a control device. Each projection device is configured to provide first, second, and third light beams of different wavelengths. The projection devices include processors and light valves. The processors include first, second, and third processors. The light valves include first, second, and third light valves. Each of the processors is connected to one of the light valves. The control device respectively provides first, second, and third signals to the first, second, and third processors. The first, second, and third processors respectively control the first, second, and third light valves to provide the first, second, and third light beams in turn according to the first, second, and third signals, so as to generate an image beam; in the same time sequence, the light beams provided by the first, second, and third valves controlled by the first, second, and third processors have different wavelengths.

8 Claims, 4 Drawing Sheets

(58) Field of Classification Search
CPC ............... G03B 21/206; G03B 21/208; G03B 21/2006; G03B 21/2013; G03B 21/2033; G03B 21/2053; G03B 21/3155; H04N 9/315; H04N 9/3105; H04N 9/3111; H04N 9/3123; H04N 9/3132; H04N 9/3147; H04N 9/3155; H04N 9/3182
See application file for complete search history.

(56) References Cited

U.S. PATENT DOCUMENTS

| | | | |
|---|---|---|---|
| 2005/0248733 | A1 | 11/2005 | Sakata et al. |
| 2008/0018983 | A1 | 1/2008 | Ishii et al. |
| 2012/0038892 | A1 | 2/2012 | Kurtz et al. |
| 2012/0099081 | A1* | 4/2012 | Huang ................. G03B 21/005 353/30 |
| 2017/0280119 | A1* | 9/2017 | Nicholson ............ H04N 9/3123 |
| 2018/0018941 | A1* | 1/2018 | Monden ............... H04N 9/3179 |
| 2019/0102134 | A1* | 4/2019 | Chen .................... H04N 9/3179 |
| 2019/0227417 | A1 | 7/2019 | Pan et al. |
| 2019/0353995 | A1 | 11/2019 | Pan et al. |
| 2021/0356855 | A1* | 11/2021 | McIntosh ............... G03B 21/10 |

FOREIGN PATENT DOCUMENTS

| | | |
|---|---|---|
| CN | 110855960 | 2/2020 |
| CN | 113489959 | 10/2021 |
| CN | 116095280 | 5/2023 |
| DE | 1622117 | 10/1970 |
| EP | 3514622 | 7/2019 |
| JP | 2010152393 | 7/2010 |
| JP | 2017187773 | 10/2017 |
| SE | 327214 | 8/1970 |

OTHER PUBLICATIONS

"Office Action of China Counterpart Application", issued on Mar. 29, 2024, p. 1-p. 9.

"Notice of allowance of China Counterpart Application", issued on Sep. 27, 2024, p. 1-p. 5.

"Office Action of China Counterpart Application", issued on Dec. 31, 2024, p. 1-p. 9.

"Office Action of U.S. Related Application, U.S. Appl. No. 17/981,479", issued on Apr. 9, 2025, p. 1-p. 41.

* cited by examiner

| cycle | (0/3)T~(1/3)T | (1/3)T~(2/3)T | (2/3)T~(3/3)T |
|---|---|---|---|
| P1 | R | G | B |
| P2 | G | B | R |
| P3 | B | R | G |
| image beams | R+G+B | R+G+B | R+G+B |

| cycle | (0/4)T~(1/4)T | (1/4)T~(2/4)T | (2/4)T~(3/4)T | (3/4)T~(4/4)T |
|---|---|---|---|---|
| P1 | R | G | B | Y |
| P2 | G | B | Y | R |
| P3 | B | Y | R | G |
| P4 | Y | R | G | B |
| image beams | R+G+B+Y | R+G+B+Y | R+G+B+Y | R+G+B+Y |

FIG. 5

Providing first, second, third, and fourth signals to processors of projection devices — S301

Providing a first light beam, a second light beam, a third light beam, and a fourth light beam of different wavelengths in turn through controlling corresponding light valves by a first processor, a second processor, a third processor, and a fourth processor according to the first signal, the second signal, the third signal, and the fourth signal, so as to generate an image beam; in the same time sequence, wavelengths of the light beams provided by the respective light valves correspondingly controlled by the first processor, the second processor, the third processor, and the fourth processor are different. — S302

FIG. 6

PROJECTION SYSTEM AND PROJECTION METHOD APPLYING THE SAME

CROSS-REFERENCE TO RELATED APPLICATION

This application claims the priority benefit of China application serial No. 202111311897.6, filed on Nov. 8, 2021. The entirety of the above-mentioned patent application is hereby incorporated by reference herein and made a part of this specification.

BACKGROUND OF THE INVENTION

1. Field of the Invention

The invention relates to an optical system and a method of applying the optical system, and particularly relates to a projection system and a projection method applying the projection system.

2. Description of Related Art

A projection device is a display device configured to generate large-size images and has been continuously improving with the evolution and innovation of technologies. An imaging principle of the projection device is to convert an illumination beam generated by an illumination system into an image beam through a light valve and then project the image beam onto a projection target (e.g., a screen or a wall) through a projection lens, so as to form a projection frame.

In large-scale exhibitions, in order to increase projection brightness, several projection devices are often applied to project images on the same projection target, whereby brightness of the images is enhanced. Due to high costs of a projector with three light valves, several projectors each having one single light valve are often stacked to increase the brightness of the images. However, the projector with one single light valve generates monochromatic light beams (such as R, G, and B light beams) in a time sequence for mixing light, which may easily lead to a rainbow effect. Such an effect becomes apparent especially at the time of recording videos.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or more embodiments of the invention provide a projection system and a projection method applying the projection system which may reduce a rainbow effect on a projection frame.

Other objectives and advantages of the invention may be further understood from the technical features disclosed in the invention.

In order to achieve one, some, or all of the aforementioned objectives or other objectives, an embodiment of the invention provides a projection system that includes a plurality of projection devices and a control device. Each of the projection devices is configured to provide a first light beam, a second light beam, and a third light beam of different wavelengths. The projection devices include a plurality of processors and a plurality of light valves. The processors include a first processor, a second processor, and a third processor. The light valves include a first light valve, a second light valve, and a third light valve. Each of the processors is connected to one of the light valves. The control device respectively provides a first signal, a second signal, and a third signal to the first processor, the second processor, and the third processor. The first, second, and third processors respectively control the first, second, and third light valves to provide the first, second, and third light beams in turn according to the first, second, and third signals, so as to generate an image beam; in the same time sequence, the light beams provided by the first, second, and third valves controlled by the first, second, and third processors have different wavelengths.

In an embodiment of the invention, the first light beam, the second light beam, and the third light beam are respectively a red light portion, a green light portion, and a blue light portion of the image beam.

In an embodiment of the invention, the projection devices have same specifications.

In an embodiment of the invention, the projection devices are further configured to provide a fourth light beam whose wavelength is different from the wavelengths of the first, second, and third light beams. The projection devices further include a fourth projection device, the fourth projection device includes a fourth processor and a fourth light valve, and the control device further provides a fourth signal to the fourth processor. The first, second, third, and fourth processors respectively control the first, second, third, and fourth light valves to provide the first, second, third, and fourth light beams in turn according to the first, second, third, and fourth signals, so as to generate the image beam, and in the same time sequence, the light beams provided by the first, second, third, and fourth valves controlled by the first, second, third, and fourth processors have different wavelengths.

In an embodiment of the invention, the first light beam, the second light beam, the third light beam, and the fourth light beam are respectively a red light portion, a green light portion, a blue light portion, and a yellow light portion of the image beam.

In an embodiment of the invention, the projection devices further include a plurality of storage units, and each of the storage units stores first information, second information, and third information.

In order to achieve one, some, or all of the aforementioned objectives or other objectives, an embodiment of the invention provides a projection method applying a projection system. The projection system includes a plurality of projection devices and a control device, and the projection devices include a plurality of processors and a plurality of light valves, wherein the processors include a first processor, a second processor, and a third processor, and the light valves include a first light valve, a second light valve, and a third light valve. The projection method further includes following steps. A first signal, a second signal, and a third signal are provided to the processors of the projection devices. The first, second, and third valves are controlled by the first, second, and third processors to provide the first, second, and third light beams of different wavelengths in turn according to the first, second, and third signals, and in the same time sequence, the light beams provided by the first, second, and third valves controlled by the first, second, and third processors have different wavelengths.

Based on the above, the projection system and the projection method applying the projection system provided in one or more embodiments of the invention at least have one of the following advantages or effects. In the projection system and the projection method applying the projection system provided in one or more embodiments of the invention, the projection system includes the projection devices and the control device, and the projection devices provide the light beams of different wavelengths in turn according to the signals provided by the control device, so as to generate the image beam. Thereby, the projection system is allowed to provide the light beams of different wavelengths in each time sequence, so as to prevent the rainbow effect on the projection frame projected by the projection system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 schematically illustrates that projection devices of the projection system depicted in FIG. 4 provide corresponding light beams in different time sequences.

FIG. 6 illustrates steps of a projection process applying a projection system according to another embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
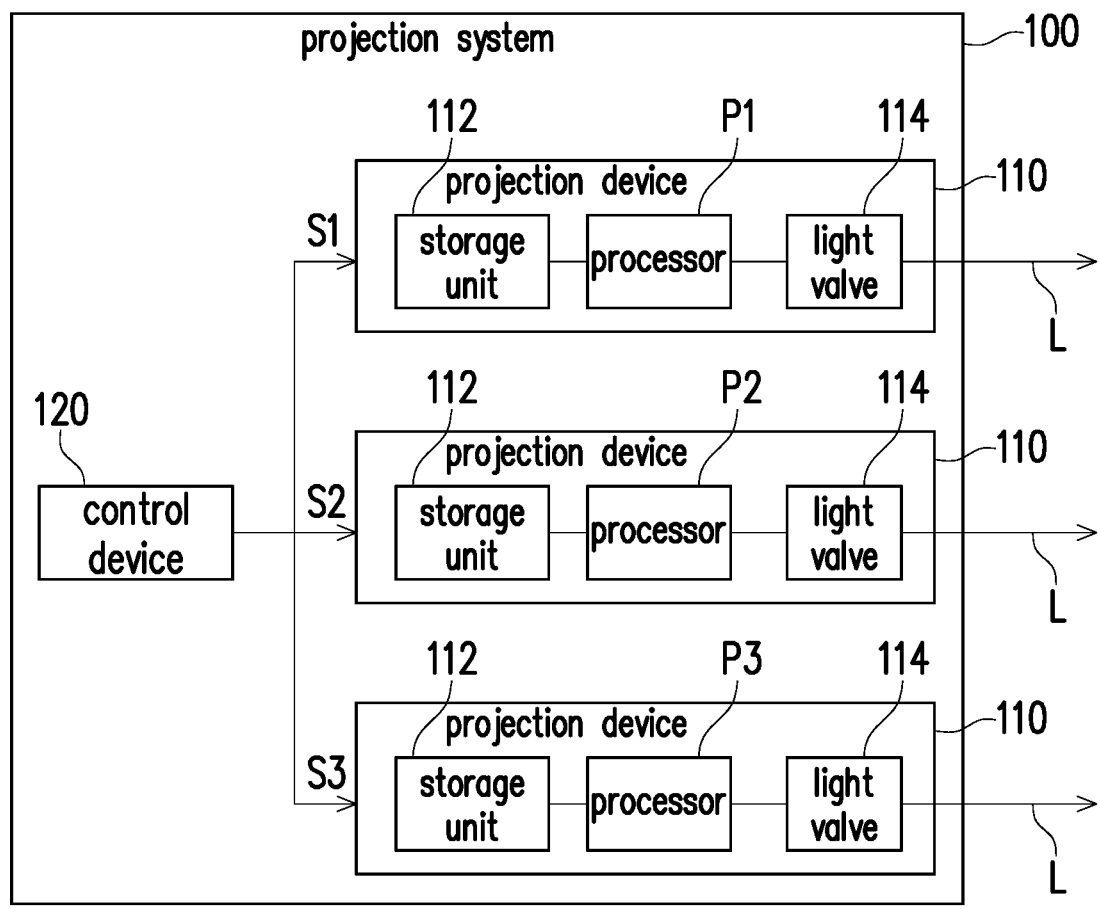
FIG. 1 is a schematic view of a projection system according to an embodiment of the invention.

FIG. 1 is a schematic view of a projection system according to an embodiment of the invention. With reference to FIG. 1, a projection system 100 is provided in this embodiment. The projection system 100 includes a plurality of projection devices 110 and a control device 120. The control device 120 is configured to provide a control signal (e.g., a first signal S1, a second signal S2, and a third signal S3 as shown in FIG. 1) to each of the projection devices 110. Each of the projection devices 110 is configured to provide image beams L to the same projection target (not shown), such as a screen or a wall, so that the image beams L may be overlapped to generate an image frame. The projection system 100 provided in this embodiment may at least be applied to environments or occasions that require a plurality of projection devices 110, such as large-scale concerts, performances, art exhibitions, outdoor cinemas, and so on.

Each of the projection devices 110 has the same specification or model number and includes one single light valve 114. Namely, the projection devices 110 in this embodiment each adopt one single light valve 114, which should however not be construed as a limitation to the invention. The light valve 114 is, for instance, a reflective light modulator, such as a digital micro-mirror device (DMD), while the form and the type of the light valve 114 are not limited in the invention.

Each of the projection devices 110 is configured to provide light beams of different wavelengths periodically in a time sequence, so as to generate the image beams L. The image beams L comprise at least one of a first light beam, a second light beam, and a third light beam. For instance, in the present embodiment, each of the projection devices 110 provides a first light beam, a second light beam, and a third light beam in a time sequence. The first light beam is, for instance, red light, the second light beam is, for instance, green light, and the third light beam is, for instance, blue light. Therefore, the first light beam, the second light beam, and the third light beam are the red light portion of the image beam L, the green light portion of the image beam L, and the blue light portion of the image beam L, respectively. In other words, the projection devices 110 provided in this embodiment has a RGB (red, green, and blue) three-color system.

In addition, in the present embodiment, each of the projection devices 110 also includes a storage unit 112 configured to store information of an order of providing the light beams. The storage unit 112 is, for instance, a storage device, such as a memory, a hard disk drive, and so on. For instance, In the present embodiment, each storage unit 112 stores first information, second information, and third information, where the first information is an order of sequentially providing the first light beam, the second light beam, and the third light beam, the second information is an order of sequentially providing the second light beam, the third light beam, and the first light beam, and the third information is an order of sequentially providing the third light beam, the first light beam, and the second light beam, which should however not be construed as a limitation to the invention. In other words, in the present embodiment, several ways to provide the light beams in different orders may be set in each of the projection devices 110 in advance. It is worth mentioning that the information stored in the storage unit 112 of each projection device 110 is the same. Therefore, while each of the projection devices 110 is being in use, these projection devices 110 may be freely exchanged or repaired and replaced, thereby improving convenience.

The projection devices 110 also include processors (P1, P2, P3), and the processors are, for instance, central processing units (CPUs), microprocessors, digital signal processors (DSPs), programmable controllers, programmable logic devices (PLDs), other similar devices, or combinations of these devices, which should however not be construed as a limitation to the invention. The processors (P1, P2, P3) connect the storage units 112 and the light valves 114. The processors (P1, P2, P3) are configured to read the first information, the second information, and the third information stored in the storage units 112, so as to control the light valves 114 to project the first light beam, the second light beam, and the third light beam in a time sequence.

The control device 120 is, for instance, a laptop, a mobile phone, a handheld tablet, a general computer, or the like; alternatively, the control device 120 may be a controller including a CPU, a microprocessor, a DSP, a programmable controller, a PLD, another similar device, or a combination of these devices, which should however not be construed as a limitation to the invention. The control device 120 respectively provides the first signal S1, the second signal S2, and the third signal S3 to the first processor P1 of the first projection device, the second processor P2 of the second projection device, and the third processor P3 of the third projection device. The first processor P1 of the first projection device, the second processor P2 of the second projection device, and the third processor P3 of the third projection device are configured to read the first information, the second information, and the third information stored in the storage units 112 according to the received first signal S1, second signal S2, and third signal S3, respectively. Here, the first signal S1 corresponds to the first information, the second signal S2 corresponds to the second information, and the third signal S3 corresponds to the third information.

Figures 2, 3:
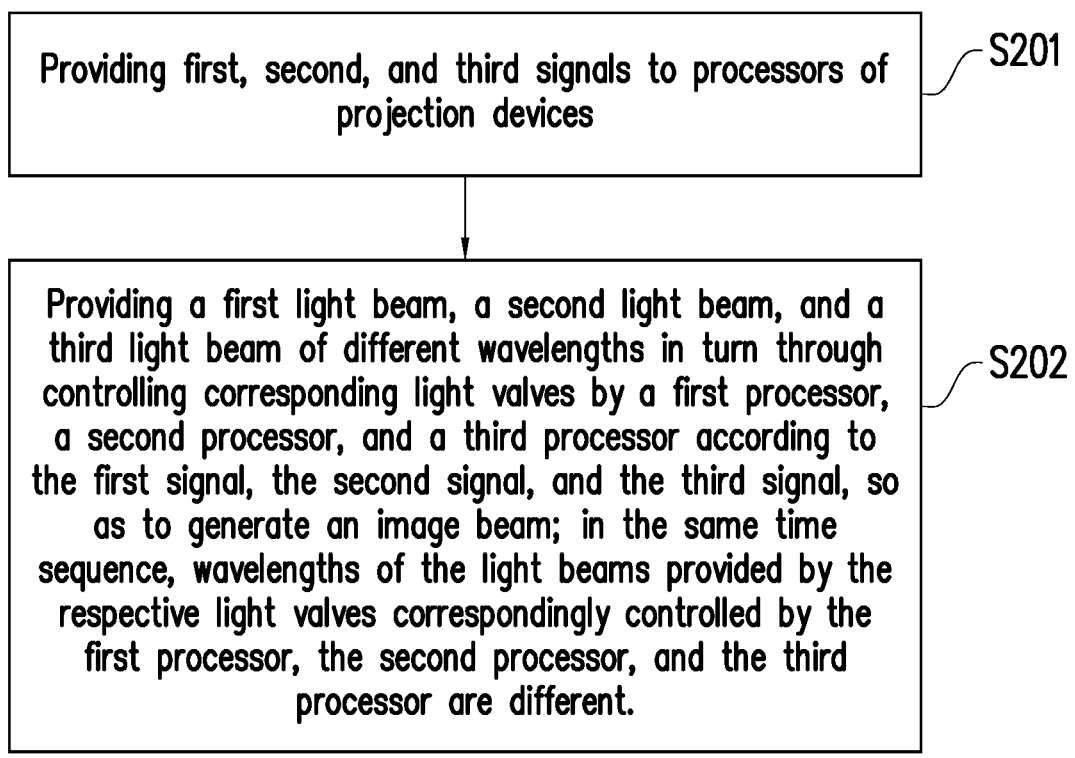
FIG. 2 schematically illustrates that projection devices of the projection system depicted in FIG. 1 provide corresponding light beams in different time sequences.
FIG. 3 illustrates steps of a projection process applying a projection system according to an embodiment of the invention.

FIG. 2 schematically illustrates that projection devices of the projection system depicted in FIG. 1 provide corresponding light beams in different time sequences. With reference to FIG. 1 and FIG. 2, T in FIG. 2 represents a cycle of processing a frame, R represents the red light portion of the image beam L, G represents the green light portion of the image beam L, and B represents the blue light portion of the image beam L. For instance, in the present embodiment, the control device 120 provides the first signal S1 to the first processor P1 of the projection device 110 (the first projection device), and the first processor P1 reads the first information stored in the storage unit 112 according to the first signal S1. Therefore, the first processor P1 controls the light valve 114 according to the first information to provide the first light beam (i.e., the red light portion of the image beam L) from (0/3)T to (1/3)T, provide the second light beam (i.e., the green light portion of the image beam L) from (1/3)T to (2/3)T, and provide the third light beam (i.e., the blue light portion of the image beam L) from (2/3)T to (3/3)T. In addition, the control device 120 provides the second signal S2 to the second processor P2 of the projection device 110 (the second projection device), and the second processor P2 reads the second information stored in the storage unit 112 according to the second signal S2. Therefore, the second processor P2 controls the light valve 114 according to the second information to provide the second light beam from (0/3)T to (1/3)T, provide the third light beam from (1/3)T to (2/3)T, and provide the first light beam from (2/3)T to (3/3)T. In addition, the control device 120 provides the third signal S3 to the third processor P3 of the projection device 110 (the third projection device), and the third processor P3 reads the third information stored in the storage unit 112 according to the third signal S3. Therefore, according to the third information, the third processor P3 controls the light valve 114 to provide the third light beam from (0/3)T to (1/3)T, provide the first light beam from (1/3)T to (2/3)T, and provide the second light beam from (2/3)T to (3/3)T. Therefore, the projection system 100 may provide the first light beam, the second light beam, and the third light beam of different wavelengths in each time sequence. As such, the rainbow effect on the projection image projected by the projection system 100 may be prevented.

FIG. 3 illustrates steps of a projection process applying a projection system according to an embodiment of the invention. With reference to FIG. 1 and FIG. 3, a projection method of a projection system provided in this embodiment may at least be applied to the projection system 100 depicted in FIG. 1, and therefore the projection system 100 depicted in FIG. 1 is taken as an example in this embodiment. First, each of the projection devices 110 receives the same image signal provided by the control device 120, and each of the projection devices 110 in different time sequences synchronously provides light beams corresponding to one single frame of the image signal. Step S201 is performed to provide the first signal S1, the second signal S2, and the third signal S3 to the individual processor of the individual projection device 110. In other words, step S201 is performed in an installation stage of the projection system 100. Specifically, the first signal S1, the second signal S2, and the third signal S3 are provided by the control device 120, and the processors (P1, P2, P3) of the projection devices 110 are configured to receive the first signal S1, the second signal S2, and the third signal S3, respectively. It is worth mentioning that the processor of one single projection device receives one of the first signal S1, the second signal S2, and the third signal S3 from the control device 120, so as to control the light valve 114 to project one single light beam in one single time sequence [(1/3)T~(2/3)T]. In other embodiments, the connections (e.g., a 3D sync port) of the projection devices 110 through cables or in a wireless manner allow the image signal provided by the control device 120 to be synchronously transmitted to the other projection devices; on the other hand, the control device 120 may merely provide the first signal S1 to the first processor P1 of the first projection device, and the first processor P1 reads the first information stored in the storage unit 112. The other projection devices may complete said step in sequence and do not require the control device 120 to send other signals. Besides, in detail, in the present embodiment, a step of storing the first information, the second information, and the third information in the storage unit 112 is also included. That is, said step is performed in a design stage of the projection system 100. Therefore, when the first processor P1, the second processor P2, and the third processor P3 receive the first signal S1, the second signal S2, and the third signal S3, the corresponding first information, second information, and third information may be read according to the signals.

Step S202 is then performed, wherein the first processor P1, the second processor P2, and the third processor P3 respectively control the corresponding light valves according to the first signal S1, the second signal S2, and the third signal S3 to provide the first light beam, the second light beam, and the third light beam of different wavelengths in turn, so as to generate the image beam L; in the same time sequence, the wavelengths of the light beams provided by the respective light valves correspondingly controlled by the first processor P1, the second processor P2, and the third processor P3 are different. In other words, step S202 is performed in an operation stage of the projection system 100. Particularly, in the present embodiment, the first processor P1, the second processor P2, and the third processor P3 read the first information according to the first signal S1, the second information according to the second signal S2, and the third information according to the third signal S3, respectively. Therefore, through the above steps, the projection devices 110 may provide the first light beam, the second light beam, and the third light beam of different wavelengths in each time sequence. As such, the rainbow effect on the projection image projected by the projection system 100 may be prevented.

Figure 4:
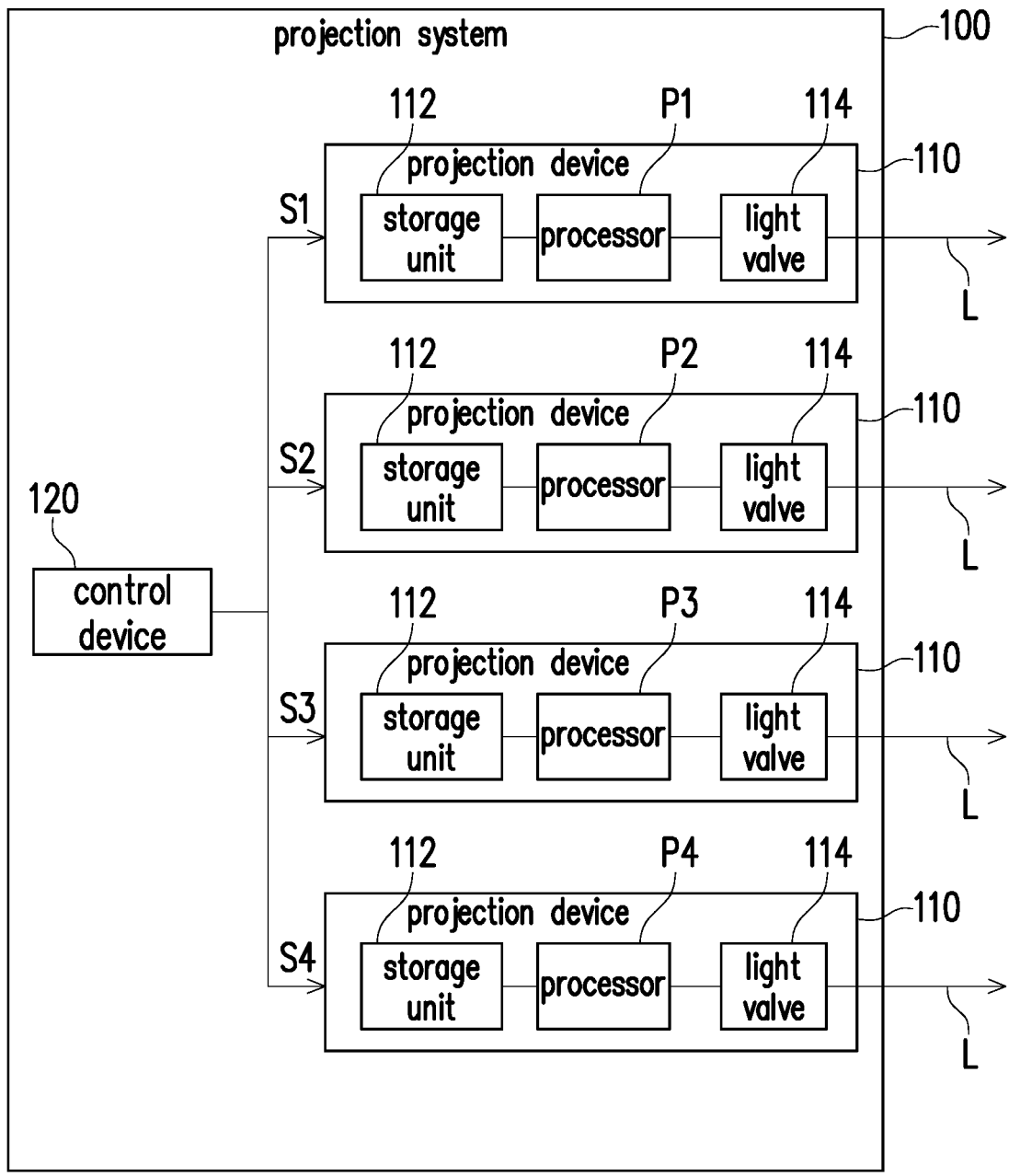
FIG. 4 is a schematic view of a projection system according to another embodiment of the invention.

FIG. 4 is a schematic view of a projection system according to another embodiment of the invention. With reference to FIG. 4, a projection system 100A provided in this embodiment is similar to the projection system 100 depicted in FIG. 1. The difference therebetween lies in that the projection devices 110 provided in this embodiment are further configured to provide a fourth light beam whose wavelength is different from those of the first light beam, the second light beam, and the third light beam. For instance, in this embodiment, the fourth light beam is yellow light, for instance. In other words, the projection devices 110 provided in this embodiment has a RGBY (red, green, blue, and yellow) four-color system.

In addition, in this embodiment, the fourth projection device 110 further includes a fourth processor P4, and the control device 120 also provides a fourth signal S4 to the fourth processor P4. Similar to the embodiment depicted in FIG. 1, in the present embodiment, the specifications of the projection devices 110 having the first processor P1, the second processor P2, the third processor P3, and the fourth processor P4 are all the same. The storage unit 112 of each projection device 110 stores the first information, the second information, the third information, and the fourth information.

On the other hand, the control device 120 provides the first signal S1, the second signal S2, the third signal S3, and the fourth signal S4 to the first processor P1, the second processor P2, the third processor P3, and the fourth processor P4, respectively. The first processor P1, the second processor P2, the third processor P3, and the fourth processor P4 control the light valves respectively according to the first signal S1, the second signal S2, the third signal S3, and the fourth signal S4, so as to generate the image beam; in the same time sequence, the light beams (i.e., the first light beam, the second light beam, the third light beam, and the fourth light beam) provided by the first processor P1, the second processor P2, the third processor P3, and the fourth processor P4 are different.

FIG. 5 schematically illustrates that projection devices of the projection system depicted in FIG. 4 provide corresponding light beams in different time sequences. With reference to FIG. 4 and FIG. 5, T in FIG. 5 represents a cycle of processing a frame, R represents the red light portion of the image beam L, G represents the green light portion of the image beam L, and B represents the blue light portion of the image beam L, and Y represents the yellow light portion of the image beam L. For instance, In the present embodiment, the control device 120 provides the first signal S1 to the first processor P1 of the projection device 110 (the first projection device), and the first processor P1 reads the first information stored in the storage unit 112 according to the first signal S1. Therefore, the first processor P1 controls the light valve 114 according to the first information to provide the first light beam (i.e., the red light portion of the image beam L) from (0/4)T to (1/4)T, provide the second light beam (i.e., the green light portion of the image beam L) from (1/4)T to (2/4)T, provide the third light beam (i.e., the blue light portion of the image beam L) from (2/4)T to (3/4)T, and provide the fourth light beam (i.e., the yellow light portion of the image beam L) from (3/4)T to (4/4)T. By analogy, the control device 120 provides the second signal S2, the third signal S3, and the fourth signal S4 to the second processor P2, the third processor P3, and the fourth processor P4 of the other projection devices 110, respectively. The second processor P2 to the fourth processor P4 read the second information to the fourth information stored in the storage unit 112 according to the second signal S2 to the fourth signal S4, respectively.

Therefore, the second processor P2 provides the second light beam from (0/4)T to (1/4)T, provides the third light beam from (1/4)T to (2/4)T, and provides the fourth light beam from (2/4)T to (3/4)T, and provides the first light beam from (3/4)T to (4/4)T. The third processor P3 provides the third light beam from (0/4)T to (1/4)T, provides the fourth light beam from (1/4)T to (2/4)T, provides the first light beam from (2/4)T to (3/4)T, and provides the second light beam from (3/4)T to (4/4)T. The fourth processor P4 provides the fourth light beam from (0/4)T to (1/4)T, provides the first light beam from (1/4)T to (2/4)T, provides the second light beam from (2/4)T to (3/4)T, and provides the third light beam from (3/4)T to (4/4)T. Therefore, the projection system 100A may provide the first light beam, the second light beam, the third light beam, and the fourth light beam of different wavelengths in each time sequence. As such, the rainbow effect on the projection image projected by the projection system 100A may be prevented.

FIG. 6 illustrates steps of a projection process applying a projection system according to another embodiment of the invention. With reference to FIG. 4 and FIG. 6, a projection method of a projection system provided in this embodiment may at least be applied to the projection system 100A depicted in FIG. 4, and therefore the projection system 100A depicted in FIG. 4 is taken as an example in this embodiment. First, each of the projection devices 110 receives the same image signal provided by the control device 120, and each of the projection devices 110 in different time sequences synchronously provides light beams corresponding to one single frame of the image signal. Step S301 is performed to provide first signal S1, the second signal S2, the third signal S3, and the fourth signal S4 to the individual processor of the individual projection device 110. In other words, step S301 is performed in an installation stage of the projection system 100A. Specifically, the first signal S1, the second signal S2, and the third signal S3 are provided by the control device 120, and the processors (P1, P2, P3, P4) of the projection devices 110 are configured to receive the first signal S1, the second signal S2, the third signal S3, and the fourth signal S4, respectively. Specifically, in the present embodiment, a step of storing the first information, the second information, the third information, and the fourth information in the storage unit 112 is also included. That is, said step is performed in a design stage of the projection system 100A. Therefore, when the first processor P1, the second processor P2, the third processor P3, and the fourth processor P4 receive the first signal S1, the second signal S2, the third signal S3, and the fourth signal S4, the corresponding first information, second information, third information, and fourth information may be read according to the signals.

Step S302 is then performed, wherein the first processor P1, the second processor P2, the third processor P3, and the fourth processor P4 respectively control the corresponding light valves according to the first signal S1, the second signal S2, the third signal S3, and the fourth signal S4 to provide the first light beam, the second light beam, the third light beam, and the fourth light beam of different wavelengths in turn, so as to generate the image beam L; in the same time sequence, the wavelengths of the light beams provided by the respective light valves correspondingly controlled by the first processor P1, the second processor P2, the third processor P3, and the fourth processor P4 are different. In other words, step S302 is performed in an operation stage of projection system 100A. Particularly, in the present embodiment, the first processor P1, the second processor P2, the third processor P3, and the fourth processor P4 read the first information according to the first signal S1, the second information according to the second signal S2, the third information according to the third signal S3, and the fourth information according to the fourth signal S4, respectively. Therefore, through the above steps, the projection devices 110 may provide the first light beam, the second light beam, the third light beam, and the fourth light beam of different wavelengths in each time sequence. As such, the rainbow effect on the projection image projected by the projection system 100A may be prevented.

To sum up, in the projection system and the projection method applying the projection system provided in one or more embodiments of the invention, the projection system includes the projection devices and the control device, and the projection devices provide the light beams of different wavelengths in turn according to the different signals provided by the control device, so as to generate the image beam. Therefore, the projection system may provide the light beams of different wavelengths in each time sequence. As such, the rainbow effect on the projection image projected by the projection system may be prevented.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising a plurality of projection devices and a control device, wherein the plurality of projection devices comprises a plurality of processors, a plurality of storage units and a plurality of light valves, the processors comprise a first processor, a second processor, and a third processor, the light valves comprise a first light valve, a second light valve, and a third light valve, each of the processors is connected to different one of the storage units, each of the processors is connected to one of the light valves, and each of the projection devices is configured to provide a first light beam, a second light beam, and a third light beam of different wavelengths, wherein the control device respectively provides a first signal, a second signal, and a third signal to the plurality of projection devices, wherein the first processor receives one of the first, second, and third signals, the second processor receives another one of the first, second, and third signals, and the third processor receives the other one of the first, second, and third signals, the first, second, and third processors respectively control the first, second, and third light valves to provide the first, second, and third light beams in turn according to the first, second, and third signals, so as to generate an image beam, and in the same time sequence, the first, second, and third light beams provided by the first, second, and third valves controlled by the first, second, and third processors have different wavelengths, wherein each of the storage units stores a first information, a second information and a third information, the first information indicates an order of sequentially providing the first light beam, the second light beam and the third light beam, the second information indicates an order of sequentially providing the second light beam, the third light beam and the first light beam, and the third information indicates an order of sequentially providing the third light beam, the first light beam and the second light beam, the first signal corresponds to the first information, the second signal corresponds to the second information, and the third signal corresponds to the third information.

2. The projection system according to claim 1, wherein the first light beam, the second light beam, and the third light beam are respectively a red light portion, a green light portion, and a blue light portion of the image beam.

3. The projection system according to claim 1, wherein the projection devices have same specifications.

4. A projection system, comprising a plurality of projection devices and a control device,
wherein the plurality of projection devices comprises a plurality of processors and a plurality of light valves, the processors comprise a first processor, a second processor, a third processor, and a fourth processor, the light valves comprise a first light valve, a second light valve, a third light valve, and a fourth light valve, each of the processors is connected to different one of the light valves, and each of the projection devices is configured to provide a first light beam, a second light beam, a third light beam, and a fourth light beam of different wavelengths,
wherein the control device respectively provides a first signal, a second signal, a third signal, and a fourth signal to the plurality of projection devices, each of the first processor, the second processor, the third processor, and the fourth processor receive different one of the first, second, third, and fourth signals, the first, second, third and fourth processors respectively control the first, second, third, and fourth light valves to provide the first, second, third light, and fourth light beams in turn according to the first, second, third, and fourth signals, so as to generate an image beam, and in the same time sequence, the first, second, third, and fourth light beams provided by the first, second, third, and fourth valves controlled by the first, second, third, and fourth processors have different wavelengths.

5. The projection system according to claim 4, wherein the first light beam, the second light beam, the third light beam, and the fourth light beam are respectively a red light portion, a green light portion, a blue light portion, and a yellow light portion of the image beam.

6. A projection method applying a projection system, the projection system comprising a plurality of projection devices and a control device, the projection devices comprising a plurality of processors and a plurality of light valves, wherein the processors comprise a first processor, a second processor, and a third processor, and the light valves comprise a first light valve, a second light valve, and a third light valve, the projection method comprising:
storing first information, second information, and third information into the plurality of projection devices;
providing a first signal, a second signal, and a third signal to the processors of the projection devices, wherein the first signal corresponds to the first information, the second signal corresponds to the second information, and the third signal corresponds to the third information;
reading the first information by the first processor according to the first signal, reading the second information by the second processor according to the second signal, and reading the third information by the third processor according to the third signal; and
controlling, by the first, second, and third processors, the first, second, and third valves to provide the first, second, and third light beams of different wavelengths in turn according to the first, second, and third signals, so as to generate an image beam, wherein in the same time sequence, the light beams provided by the first, second, and third valves controlled by the first, second, and third processors have different wavelengths.

7. The projection method according to claim 6, further comprising:
providing a fourth signal to a fourth projection device of the projection devices, the fourth projection device comprising a fourth processor and a fourth light valve; and
controlling, by the first, second, third, and fourth processors, the first, second, third, and fourth valves to provide the first, second, third, and fourth light beams of different wavelengths in turn according to the first, second, third, and fourth signals, so as to generate the image beam, wherein in the same time sequence, the light beams provided by the first, second, third, and fourth valves controlled by the first, second, third, and fourth processors have different wavelengths.

8. The projection method according to claim 7, further comprising:
storing first information, second information, third information, and fourth information into the projection devices; and
reading the first information by the first processor according to the first signal, reading the second information by the second processor according to the second signal, reading the third information by the third processor according to the third signal, and reading the fourth information by the fourth processor according to the fourth signal.

* * * * *